US010035891B2

(12) United States Patent
Zheng et al.

(10) Patent No.: US 10,035,891 B2
(45) Date of Patent: Jul. 31, 2018

(54) MODIFIED THERMOPLASTIC POLYURETHANE ROLLING FILM AND PREPARATION METHOD

(71) Applicant: FUZHOU UNIVERSITY, Fuzhou (CN)

(72) Inventors: Yuying Zheng, Fuzhou (CN); Jinxian Lin, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 196 days.

(21) Appl. No.: 15/113,813

(22) PCT Filed: Dec. 24, 2014

(86) PCT No.: PCT/CN2014/094866
§ 371 (c)(1),
(2) Date: Jul. 22, 2016

(87) PCT Pub. No.: WO2015/109913
PCT Pub. Date: Jul. 30, 2015

(65) Prior Publication Data
US 2016/0340483 A1    Nov. 24, 2016

(30) Foreign Application Priority Data
Jan. 24, 2014  (CN) .......................... 2014 1 0034422

(51) Int. Cl.
| | |
|---|---|
| *C08J 5/18* | (2006.01) |
| *B29C 47/00* | (2006.01) |
| *B29B 7/00* | (2006.01) |
| *B29C 47/78* | (2006.01) |
| *B29B 9/12* | (2006.01) |
| *B29B 7/02* | (2006.01) |
| *B29K 75/00* | (2006.01) |
| *B29L 7/00* | (2006.01) |
| *B29B 9/06* | (2006.01) |
| *B29K 21/00* | (2006.01) |
| *B29K 23/00* | (2006.01) |
| *B29K 83/00* | (2006.01) |

(52) U.S. Cl.
CPC .................. *C08J 5/18* (2013.01); *B29B 7/005* (2013.01); *B29B 9/12* (2013.01); *B29C 47/0004* (2013.01); *B29C 47/0021* (2013.01); *B29C 47/0059* (2013.01); *B29C 47/78* (2013.01); *B29B 7/02* (2013.01); *B29B 9/06* (2013.01); *B29K 2021/003* (2013.01); *B29K 2023/00* (2013.01); *B29K 2075/00* (2013.01); *B29K 2083/00* (2013.01); *B29K 2509/14* (2013.01); *B29K 2995/0016* (2013.01); *B29K 2995/0055* (2013.01); *B29L 2007/008* (2013.01); *C08J 2323/02* (2013.01); *C08J 2375/04* (2013.01); *C08J 2383/00* (2013.01); *C08J 2423/02* (2013.01); *C08J 2423/14* (2013.01); *C08J 2475/04* (2013.01); *C08J 2483/04* (2013.01)

(58) Field of Classification Search
CPC .......... C08L 51/00; C08L 83/00; C08L 83/04; C08L 83/06; C08L 83/08; C08L 75/00; C08L 75/06; C08L 75/08; C08J 5/18; C08J 5/2218
See application file for complete search history.

(56) References Cited

U.S. PATENT DOCUMENTS

| | | | |
|---|---|---|---|
| 2003/0109623 A1* | 6/2003 | Gornowicz et al. . | C08G 77/458 524/492 |
| 2011/0281984 A1* | 11/2011 | Garois ................... | C08L 23/02 524/168 |

FOREIGN PATENT DOCUMENTS

| | | |
|---|---|---|
| CN | 1568351 | 1/2005 |
| CN | 102250464 | 11/2011 |
| CN | 202156042 | 3/2012 |
| CN | 103756287 | 4/2014 |
| JP | 2000290438 | 10/2000 |

OTHER PUBLICATIONS

International Search Report for PCT/ PCT/CN2014/094866 dated Feb. 13, 2015 and its English translation from WIPO.
Written Opinion of the International Searching Authority for PCT/CN2014/094866 dated Feb. 13, 2015 and its English machine translation by Google Translate.

* cited by examiner

*Primary Examiner* — Christopher M Rodd
(74) *Attorney, Agent, or Firm* — Luoh J. Wu; Continent Patent Office LLP

(57) ABSTRACT

This present invention discloses a modified thermoplastic polyurethane (TPU) rolling film and relates to a preparation method thereof. The modified thermoplastic polyurethane (TPU) rolling film comprises: 100 parts by weight of TPU resin, 3 to 8 parts by weight of Thermoplastic polyolefin (TPO) resin, 5 to 10 parts by weight of Thermo Plastic Silicone Vulcanizate (TPSiV) resin, 5 to 15 parts by weight of TPU color masterbatch, 0.5 to 1.5 parts by weight of antioxidant, 0.5 to 1.5 parts by weight of light stabilizer, 10 to 15 parts by weight of flame retardant, and 0.03 to 0.1 parts by weight of compound lubricant. This kind of rolling film has a uniform thickness and high surface gloss, and is yellowing resistant, abrasion resistant, flame retardant, and low-temperature resistant.

13 Claims, No Drawings

MODIFIED THERMOPLASTIC POLYURETHANE ROLLING FILM AND PREPARATION METHOD

CROSS-REFERENCE TO RELATED APPLICATIONS

This application is the U.S. National Stage of International Patent Application No. PCT/CN2014/094866 filed on Dec. 24, 2014, which claims priority to Chinese Patent Application No. 201410034422.0 filed on Jan. 24, 2014, the disclosures of which are hereby incorporated by reference in their entireties.

FIELD AND BACKGROUND OF THE INVENTION

This present invention, which discloses a modified thermoplastic polyurethane (TPU) rolling film and a preparation method thereof, belongs to the field of resin film manufacturing.

Thermoplastic polyurethane (TPU) film has been widely used in automotive electronics, medical equipment, daily necessities and other areas due to its superior characteristics of excellent toughness, high strength, non-toxic, tasteless, and thermal processing performance. Tape casting is currently a widely-used method for the manufacture of TPU films. The method suffers from low productivity, non-uniform thickness, and high production cost because all of the modified additives must be granulated before being added. As such, application of the thermoplastic polyurethane (TPU) film is limited.

This present invention has optimized the recipe and the preparation method, overcome the process issues of uneven plasticizing, easily-stuck to the roller and so on. The modified thermoplastic polyurethane (TPU) rolling film disclosed herein offers better economic and social advantages due to its properties of high productivity, uniform thickness, high surface gloss, and excellent resistance to yellowing, abrasion, flame, low temperature.

SUMMARY OF THE INVENTION

The present invention aims at developing a modified TPU rolling film and a preparation method thereof to overcome the shortcomings of the prior art. The modified TPU rolling film disclosed herein offers the features of high productivity, uniform thickness, high surface gloss, yellowing resistant (48 hours, UVB, reach to 4 grade), abrasion resistant, flame retardant (the thickness is 2.0 mm, reach to V0 grade), low temperature resistant (−30° C.), and excellent folding capability (Folding 150000 times to 200000 times).

The modified TPU rolling film comprises:
100 parts by weight of TPU resin,
3 to 8 parts by weight of Thermoplastic polyolefin (TPO) resin,
5 to 10 parts by weight of Thermo Plastic Silicone Vulcanizate (TPSiV) resin,
5 to 15 parts by weight of TPU color masterbatch,
0.5 to 1.5 parts by weight of antioxidant,
0.5 to 1.5 parts by weight of light stabilizer,
10 to 15 parts by weight of flame retardant,
and 0.03 to 0.1 parts by weight of compound lubricant.

The grade of said TPU resin is TPU DP6386A, which was purchased from Bayer AG.

The grade of said TPO resin is CMW402, which was purchased from Exxon Mobil.

The said thermo Plastic Silicone Vulcanizate (TPSiV) resin is 3011 series, which was purchased from Dow Corning.

The said TPU color masterbatch is prepared through an extruding and granulating process with TPU resin (DP6386A) used as carrier and toner.

The said antioxidant is prepared by mixing β-(3,5-di-tert-butyl-4-hydroxyphenyl) propionic acid octadecanol ester with N,N'-hexamethylene bis (3,5-di-tert-butyl-4-hydroxyphenyl propionamide) at a mass ratio of 1:1.5.

The said light stabilizer is prepared by mixing 2-(2'-hydroxy-3',5'-cumylphenyl) benzotriazole with 2-(2'-hydroxy-3',5'-di-tert-amyl-phenyl) benzotriazole at a mass ratio of 1:2.

The flame retardant is prepared by mixing the organophosphate flame retardants with talcum powder of 5000 mesh at a mass ratio of 3:1.

The compound lubricant is prepared by mixing Eerucamide with Oleic acid amide and Stearic acid, at a mass ratio of 1:1:1.

The TPSiV resin, developed by the Dow Corning, is a kind of thermoplastic silicone elastomer which is composed by hermoplastic substrates and vulcanisation silicone rubber particles.

The process for preparing the modified TPU rolling film comprises the following steps:

Step (1): adding all ingredients according to the specified compositions into a stirring pot and stirring the mixture evenly at a high speed under a temperature between 85° C. and 100° C.;

Step (2): adding the mixture obtained from Step (1) into an internal batch mixer wherein the mixture is mixed for 3 to 5 minutes;

Step (3): plasticating, then extruding, and finally calendering the mixture obtained from Step (2) using a rolling turbine, an extruder, and a calender, respectively, to produce the film. The temperatures of said plasticating, extruding, and calendaring are maintained at 130° C. to 150° C., 130° C. to 150° C., 140° C. to 160° C. respectively.

In the present invention, TPO resin can control the hardness of TPU films and improve TPU workability. TPSiV resin can make TPU film surface clean and dry, yet still maintains high mechanical properties after air aging. The modified TPU rolling film has the properties of both TPU and organosilicon material, has excellent aging resistance, scratch resistance, and oil resistance, and can be used at low temperature. More importantly, TPSiV resin has good compatibility with TPU resin. The antioxidant is compounded by antioxidants of different melting points and molecular weights. The light stabilizer is compounded by light stabilizers of different melting points and molecular weights. Every component acts synergistically with each other, which improves the yellowing resistance of TPU films. The flame retardant is a blend of the organophosphate flame retardants and talcum powder, which form synergies, decrease the fire resistance of melt drip of TPU material, and improve the flame retardance. The compound lubricant is a blend of Erucamide, Oleic acid amide and Stearic acid with different primary effect and termination effect in machining. Erucamide, Oleic acid amide, and Stearic acid complement each other seamlessly, which ensures that the compound lubricant has excellent properties during the processing, and can avoid the phenomenon of uneven plasticizing and sticking.

The modified TPU rolling film disclosed herein offers high productivity, uniform thickness, high surface gloss, excellent resistance to yellowing (48 hours, UVB, reach to grade 4), abrasion, flame (the thickness is 2.0 mm, reach to grade V0), and low temperature (−30° C.), and excellent folding capability (Folding 150000 times to 200000 times), and free from the phenomenon of uneven plasticizing and sticking.

DESCRIPTION OF THE PREFERRED EMBODIMENTS

The present invention is further described in the following three exemplified embodiments to illustrate the application of the principles of the invention. It is understood that the invention may be embodied otherwise without departing from such principles. The scope of the claims of the present invention expressly should not be limited to such exemplary or preferred embodiments.

Embodiment 1

In this embodiment, the present application provides a modified TPU rolling film comprising:
100 parts by weight of TPU resin,
3 parts by weight of TPO resin,
10 parts by weight of TPSiV resin,
5 parts by weight of TPU color masterbatch,
0.5 parts by weight of antioxidant,
1.5 parts by weight of light stabilizer,
15 parts by weight of flame retardant,
and 0.1 parts by weight of compound lubricant.

The grade of said TPU resin is TPU DP6386A, which was purchased from Bayer Company.

The grade of said TPO resin is CMW402, which was purchased from Exxon Mobil.

The said TPSiV resin is 3011 series, which was purchased from Dow Corning.

The said TPU color masterbatch is prepared through the extruding and granulating process with TPU resin (DP6386A) used as carrier and toner.

The said antioxidant is prepared by mixing β-(3,5-di-tert-butyl-4-hydroxyphenyl) propionic acid octadecanol ester (antioxidant 1076) with N, N'-hexamethylene bis (3,5-di-tert-butyl-4-hydroxyphenyl propionamide) (antioxidant 1098) at a mass ratio of 1:1.5.

The said light stabilizer is prepared by mixing 2-(2'-hydroxy-3',5'-cumylphenyl) benzotriazole (UV234) with 2-(2'-hydroxy-3',5'-di-tert-amyl-phenyl) benzotriazole (UV328) at a mass ratio of 1:2.

The flame retardant is prepared by mixing the organo-phosphate flame retardants (grade OP1320) with talcum powder of 5000 mesh at a mass ratio of 3:1.

The compound lubricant is prepared by mixing erucamide with Oleic acid amide and Stearic acid, at a mass ratio of 1:1:1.

The TPSiV resin, developed by the Dow Corning, is a kind of thermoplastic silicone elastomer that is composed of hermoplastic substrates and vulcanisation silicone rubber particles.

The present application further provides a process for preparing the modified thermoplastic polyurethane (TPU) rolling film, comprising the following steps:

Step (1): adding all ingredients according to the compositions into a stirring pot and stir the mixture evenly at a high speed under a temperature of 85° C.;

Step (2): pouring the mixture from Step (1) into an internal batch mixer wherein the mixture is mixed for 5 minutes;

Step (3): plasticating, then extruding, and finally calendering the mixture obtained from Step (2) using a rolling turbine, an extruder, and a calender, respectively. The temperatures of said plasticating, extruding, and calendaring are maintained at 130° C., 130° C., 150° C. respectively.

Embodiment 2

In the second embodiment, the present application provides a modified TPU rolling film comprising:
100 parts by weight of TPU resin,
5 parts by weight of TPO resin,
8 parts by weight of TPSiV resin,
10 parts by weight of TPU color masterbatch,
0.7 parts by weight of antioxidant,
1.1 parts by weight of light stabilizer,
13 parts by weight of flame retardant,
and 0.08 parts by weight of compound lubricant.

The grade of said TPU resin is TPU DP6386A, which was purchased from Bayer Company.

The grade of said TPO resin is CMW402, which was purchased from Exxon Mobil.

The said TPSiV resin is 3011 series, which was purchased from Dow Corning.

The said TPU color masterbatch is prepared through the extruding and granulating process with TPU resin (DP6386A) used as carrier and toner.

The said antioxidant is prepared by mixing β-(3,5-di-tert-butyl-4-hydroxyphenyl) propionic acid octadecanol ester (antioxidant 1076) with N, N'-hexamethylene bis (3,5-di-tert-butyl-4-hydroxyphenyl propionamide) (antioxidant 1098) at a mass ratio of 1:1.5, respectively.

The said light stabilizer is prepared by mixing 2-(2'-hydroxy-3',5'-cumylphenyl) benzotriazole (UV234) with 2-(2'-hydroxy-3',5'-di-tert-amyl-phenyl) benzotriazole (UV328) at a mass ratio of 1:2.

The flame retardant is prepared by mixing the organo-phosphate flame retardants (grade OP1320) with talcum powder of 5000 mesh at a mass ratio of 3:1.

The compound lubricant is prepared by mixing erucamide with Oleic acid amide and Stearic acid, at a mass ratio of 1:1:1.

The TPSiV resin, developed by the Dow Corning, is a kind of thermoplastic silicone elastomer that is composed of hermoplastic substrates and vulcanisation silicone rubber particles.

The present application further provides a process for preparing the modified thermoplastic polyurethane (TPU) rolling film, comprising the following steps:

Step (1): adding all ingredients according to the compositions into a stirring pot and stir the mixture evenly at a high speed under a temperature of 90° C.;

Step (2): pouring the mixture from Step (1) into an internal batch mixer wherein the mixture is mixed for 4 minutes;

Step (3): plasticating, then extruding, and finally calendering the mixture obtained from Step (2) using a rolling turbine, an extruder, and a calender, respectively. The temperatures of said plasticating, extruding, and calendaring are maintained at 140° C., 150° C., 140° C. respectively.

Embodiment 3

In the third embodiment, the present application provides a modified TPU rolling film comprising:
100 parts by weight of TPU resin,
8 parts by weight of TPO resin,
5 parts by weight of TPSiV resin,
15 parts by weight of TPU color masterbatch, 1.5 parts by weight of antioxidant,
0.5 parts by weight of light stabilizer,
10 parts by weight of flame retardant,
and 0.03 parts by weight of compound lubricant.

The grade of said TPU resin is TPU DP6386A, which was purchased from Bayer Company.

The grade of said TPO resin is CMW402, which was purchased from Exxon Mobil.

The said TPSiV resin is 3011 series, which was purchased from Dow Corning.

The said TPU color masterbatch is prepared through the extruding and granulating process with TPU resin (DP6386A) used as carrier and toner.

The said antioxidant is prepared by mixing β-(3,5-di-tert-butyl-4-hydroxyphenyl) propionic acid octadecanol ester (antioxidant 1076) with N, N'-hexamethylene bis (3,5-di-tert-butyl-4-hydroxyphenyl propionamide) (antioxidant 1098) at a mass ratio of 1:1.5, respectively.

The said light stabilizer is prepared by mixing 2-(2'-hydroxy-3',5'-cumylphenyl) benzotriazole (UV234) with 2-(2'-hydroxy-3',5'-di-tert-amyl-phenyl) benzotriazole (UV328) at a mass ratio of 1:2.

The flame retardant is prepared by mixing the organophosphate flame retardants (grade OP1320) with talcum powder of 5000 mesh at a mass ratio of 3:1.

The compound lubricant is prepared by mixing Erucamide with Oleic acid amide and Stearic acid, at a mass ratio of 1:1:1.

The TPSiV resin, developed by the Dow Corning, is a kind of thermoplastic silicone elastomer that is composed of hermoplastic substrates and vulcanisation silicone rubber particles.

The present application further provides a process for preparing the modified thermoplastic polyurethane (TPU) rolling film, comprising the following steps:

Step (1): adding all ingredients according to the compositions into a stirring pot and stir the mixture evenly at a high speed under a temperature of 100° C.;

Step (2): pouring the mixture from Step (1) into an internal batch mixer wherein the mixture is mixed for 5 minutes;

Step (3): plasticating, then extruding, and finally calendering the mixture obtained from Step (2) using a rolling turbine, an extruder, and a calender, respectively. The temperatures of said plasticating, extruding, and calendaring are maintained at 150° C., 140° C., 160° C., respectively.

What is claimed is:

1. A modified thermoplastic polyurethane (TPU) rolling film comprising:
   100 parts by weight of TPU resin,
   3 to 8 parts by weight of Thermoplastic polyolefin (TPO) resin,
   5 to 10 parts by weight of Thermo Plastic Silicone Vulcanizate (TPSiV) resin,
   5 to 15 parts by weight of TPU color masterbatch,
   0.5 to 1.5 parts by weight of antioxidant,
   0.5 to 1.5 parts by weight of light stabilizer,
   10 to 15 parts by weight of flame retardant,
   and 0.03 to 0.1 parts by weight of compound lubricant.

2. The composition as claimed in claim 1 wherein the TPU color masterbatch is prepared through an extruding and granulation process by mixing TPU resin with toner together.

3. The composition as claimed in claim 1 wherein the antioxidant is prepared by mixing β-(3,5-di-tert-butyl-4-hydroxyphenyl) propionic acid octadecanol ester with N, N'-hexamethylene bis (3,5-di-tert-butyl-4-hydroxyphenyl propionamide) at a mass ratio of 1:1.5.

4. The composition as claimed in claim 1 wherein the light stabilizer is prepared by mixing 2-(2'-hydroxy-3',5'-cumylphenyl) benzotriazole with 2-(2'-hydroxy-3',5'-di-tert-amyl-phenyl) benzotriazole at a mass ratio of 1:2.

5. The composition as claimed in claim 1 wherein the flame retardant is prepared by mixing organophosphate flame retardant with talcum powder of 5000 mesh at a mass ratio of 3:1.

6. The composition as claimed in claim 1 wherein the compound lubricant is prepared by mixing Erucamide with Oleic acid amide and Stearic acid at a mass ratio of 1:1:1.

7. A process of preparing a modified TPU rolling film as claimed in claim 1 comprising the following steps:
   Step 1: add all ingredients according to the compositions specified in claims 1-6 to a stirring pot and stir the mixture evenly at a high speed under a temperature between 85° C. and 100° C.;
   Step 2: pour the mixture from Step 1 into an internal mixer wherein the mixture is mixed for 3 to 5 minutes;
   Step 3: the mixture from Step 2 is subsequently plasticated, extruded, and calendered using a rolling turbine, an extruder, and a calender, respectively.

8. The process according to claim 7 wherein the temperatures for plasticating, extruding, and calendaring as described in Step 3 are maintained at 130° C. to 150° C., 130° C. to 150° C., 140° C. to 160° C. respectively.

9. The process according to claim 7 wherein the TPU color masterbatch is prepared through an extruding and granulation process by mixing TPU resin with toner together.

10. The process according to claim 7 wherein the antioxidant is prepared by mixing β-(3,5-di-tert-butyl-4-hydroxyphenyl) propionic acid octadecanol ester with N, N'-hexamethylene bis (3,5-di-tert-butyl-4-hydroxyphenyl propionamide) at a mass ratio of 1:1.5.

11. The process according to claim 7 wherein the light stabilizer is prepared by mixing 2-(2'-hydroxy-3',5'-cumylphenyl) benzotriazole with 2-(2'-hydroxy-3',5'-di-tert-amyl-phenyl) benzotriazole at a mass ratio of 1:2.

12. The process according to claim 7 wherein the flame retardant is prepared by mixing organophosphate flame retardant with talcum powder of 5000 mesh at a mass ratio of 3:1.

13. The process according to claim 7 wherein the compound lubricant is prepared by mixing Erucamide with Oleic acid amide and Stearic acid at a mass ratio of 1:1:1.

* * * * *